US009062742B2

(12) United States Patent
Suzuki et al.

(10) Patent No.: US 9,062,742 B2
(45) Date of Patent: Jun. 23, 2015

(54) CONTINUOUSLY-VARIABLE TRANSMISSION AND CONTINUOUSLY-VARIABLE TRANSMISSION CONTROL METHOD

(71) Applicant: JATCO LTD, Fuji-shi, Shizuoka (JP)

(72) Inventors: Hideaki Suzuki, Yokohama (JP); Yoshio Yasui, Machida (JP); Yuuji Nagase, Yokohama (JP); Fumito Shinohara, Mishima (JP)

(73) Assignee: JATCO LTD, Fuji-shi (JP)

( * ) Notice: Subject to any disclaimer, the term of this patent is extended or adjusted under 35 U.S.C. 154(b) by 0 days.

(21) Appl. No.: 14/364,566

(22) PCT Filed: Nov. 12, 2012

(86) PCT No.: PCT/JP2012/079262
§ 371 (c)(1),
(2) Date: Jun. 11, 2014

(87) PCT Pub. No.: WO2013/088881
PCT Pub. Date: Jun. 20, 2013

(65) Prior Publication Data
US 2014/0342860 A1    Nov. 20, 2014

(30) Foreign Application Priority Data
Dec. 13, 2011  (JP) .................................. 2011-271982

(51) Int. Cl.
*G06F 17/00* (2006.01)
*F16H 9/18* (2006.01)
(Continued)

(52) U.S. Cl.
CPC .................. *F16H 9/18* (2013.01); *F16H 61/02* (2013.01); *F16H 61/662* (2013.01); *F16H 61/66259* (2013.01)

(58) Field of Classification Search
None
See application file for complete search history.

(56) References Cited

U.S. PATENT DOCUMENTS 5,672,137 A * 9/1997 Adachi et al. ................... 477/45
6,980,897 B2 * 12/2005 Aoki et al. ...................... 701/51
(Continued)

FOREIGN PATENT DOCUMENTS

JP    61-105352 A    5/1986
JP    63-020560 U    2/1988
(Continued)

*Primary Examiner* — Dirk Wright
(74) *Attorney, Agent, or Firm* — Foley & Lardner LLP

(57) ABSTRACT

A continuously-variable transmission, which has a first pulley, which has a first fixed pulley and a first mobile pulley, a second pulley, which has a second fixed pulley and a second mobile pulley, and a drive force transmitting member, which is stretched between the first pulley and the second pulley, is provided, and this continuously-variable transmission has an indicated pressure calculation section, which calculates the indicated pressure of the first pulley, a stroke speed calculation section, which calculates the stroke speed of the first mobile pulley, and an oil pressure calculation section, which, when oil is discharged from an oil chamber, calculates the amount of increase of oil pressure in a first pulley oil chamber that increases compared to the indicated pressure due to the channel resistance of the discharge path, based on the channel resistance and the stroke speed, and a correction section, which, when oil is discharged from the first pulley oil chamber, subtracts the amount of increase of oil pressure from the first pulley pressure based on a target speed ratio and input torque, and corrects the indicated pressure of the first pulley.

7 Claims, 3 Drawing Sheets

(51) Int. Cl.
  *F16H 61/02*  (2006.01)
  *F16H 61/662*  (2006.01)

(56) References Cited

U.S. PATENT DOCUMENTS

| | | | |
|---|---|---|---|
| 7,546,196 B2* | 6/2009 | Izumi et al. | 701/51 |
| 7,553,256 B2* | 6/2009 | Kim et al. | 477/46 |
| 2007/0060441 A1 | 3/2007 | Kim et al. | |

FOREIGN PATENT DOCUMENTS

| | | |
|---|---|---|
| JP | 63-275847 A | 11/1988 |
| JP | 02-012562 U | 1/1990 |
| JP | 2000-081124 A | 3/2000 |
| JP | 2000-097321 A | 4/2000 |
| JP | 2004-069026 A | 3/2004 |
| JP | 2007-071301 A | 3/2007 |
| JP | 2009-185885 A | 8/2009 |
| JP | 2010-270792 A | 12/2010 |

* cited by examiner

CONTINUOUSLY-VARIABLE TRANSMISSION AND CONTINUOUSLY-VARIABLE TRANSMISSION CONTROL METHOD

TECHNICAL FIELD

The present invention relates to a continuously-variable transmission and a method of controlling a continuously-variable transmission.

BACKGROUND ART

Conventionally, a continuously-variable transmission that makes the moving speed of a mobile pulley changeable is disclosed in JP2000-81124A.

SUMMARY OF INVENTION

When a mobile pulley is allowed to move by discharging oil from an oil chamber, the inner pressure of the pulley chamber increases as the moving speed of the mobile pulley increases, due to the channel resistance of the discharge path.

However, with the above continuously-variable transmission, this point is not taken into account, and, when a mobile pulley is allowed to move by discharging oil from the oil chamber, the inner pressure of the pulley chamber increases due to the channel resistance of the discharge path, and the mobile pulley is prevented from moving. Consequently, poor performance of the actual speed ratio in following the target speed ratio becomes a problem.

The present invention has been made in order to solve such a problem, and it is therefore an object of the present invention to improve the performance of the actual speed ratio in following the target speed ratio.

A continuously-variable transmission according to an example of the present invention is a continuously-variable transmission having: a first pulley, which includes: a first fixed pulley; and a first mobile pulley, which is arranged on a same axis with the first fixed pulley, and which changes a width of a groove formed between the first mobile pulley and the first fixed pulley by moving along an axial direction in accordance with supply and discharge of oil to and from a first pulley oil chamber; a second pulley, which includes: a second fixed pulley; and a second mobile pulley, which is arranged on a same axis with the second fixed pulley, and which changes a width of a groove formed between the second mobile pulley and the second fixed pulley by moving along an axial direction; and a drive force transmitting member, which is mounted between the first pulley and the second pulley, and the continuously-variable transmission has: indicated pressure calculating means configured to calculate an indicated pressure of the first pulley; stroke speed calculating means configured to calculate a stroke speed which is a moving speed of the first mobile pulley along the axial direction; and oil pressure calculating means configured to calculate an amount of increase of oil pressure in the first pulley oil chamber that increases due to channel resistance of a discharge path, based on the channel resistance and the stroke speed when oil is discharged from the first pulley oil chamber, and, when oil is discharged from the first pulley oil chamber, the indicated pressure calculating means is configured to subtract the amount of increase of oil pressure from the first pulley pressure calculated based on a target speed ratio and input torque, and calculate the indicated pressure of the first pulley.

A continuously-variable transmission control method according to another example of the present invention is a continuously-variable transmission control method for controlling a continuously-variable transmission having: a first pulley, which includes: a first fixed pulley; and a first mobile pulley, which is arranged on a same axis with the first fixed pulley, and which changes a width of a groove formed between the first mobile pulley and the first fixed pulley by moving along an axial direction in accordance with supply and discharge of oil to and from a first pulley oil chamber; a second pulley, which includes: a second fixed pulley; and a second mobile pulley, which is arranged on a same axis with the second fixed pulley, and which changes a width of a groove formed between the second mobile pulley and the second fixed pulley by moving along an axial direction; and a drive force transmitting member, which is mounted between the first pulley and the second pulley, and the continuously-variable transmission control method includes: calculating a stroke speed, which is a moving speed of the first mobile pulley along the axial direction; when oil is discharged from the first pulley oil chamber, calculating an amount of increase of oil pressure in the first pulley oil chamber that increases due to channel resistance of a discharge path, based on the channel resistance and the stroke speed; and, when oil is discharged from the first pulley oil chamber, subtracting the amount of increase of oil pressure from the first pulley pressure calculated based on a target speed ratio and input torque from a drive source, and calculating an indicated pressure of the first pulley.

According to these examples, when oil is discharged from the oil chamber, a pulley indicated pressure, which is reduced by the amount of increase of oil pressure in the oil chamber, is used, so that it is possible to improve the performance of the actual speed ratio in following the target speed ratio.

Embodiments of the present invention and advantages of the present invention will be described in detail below with reference to the accompanying drawings.

DESCRIPTION OF EMBODIMENTS

Figure 1:
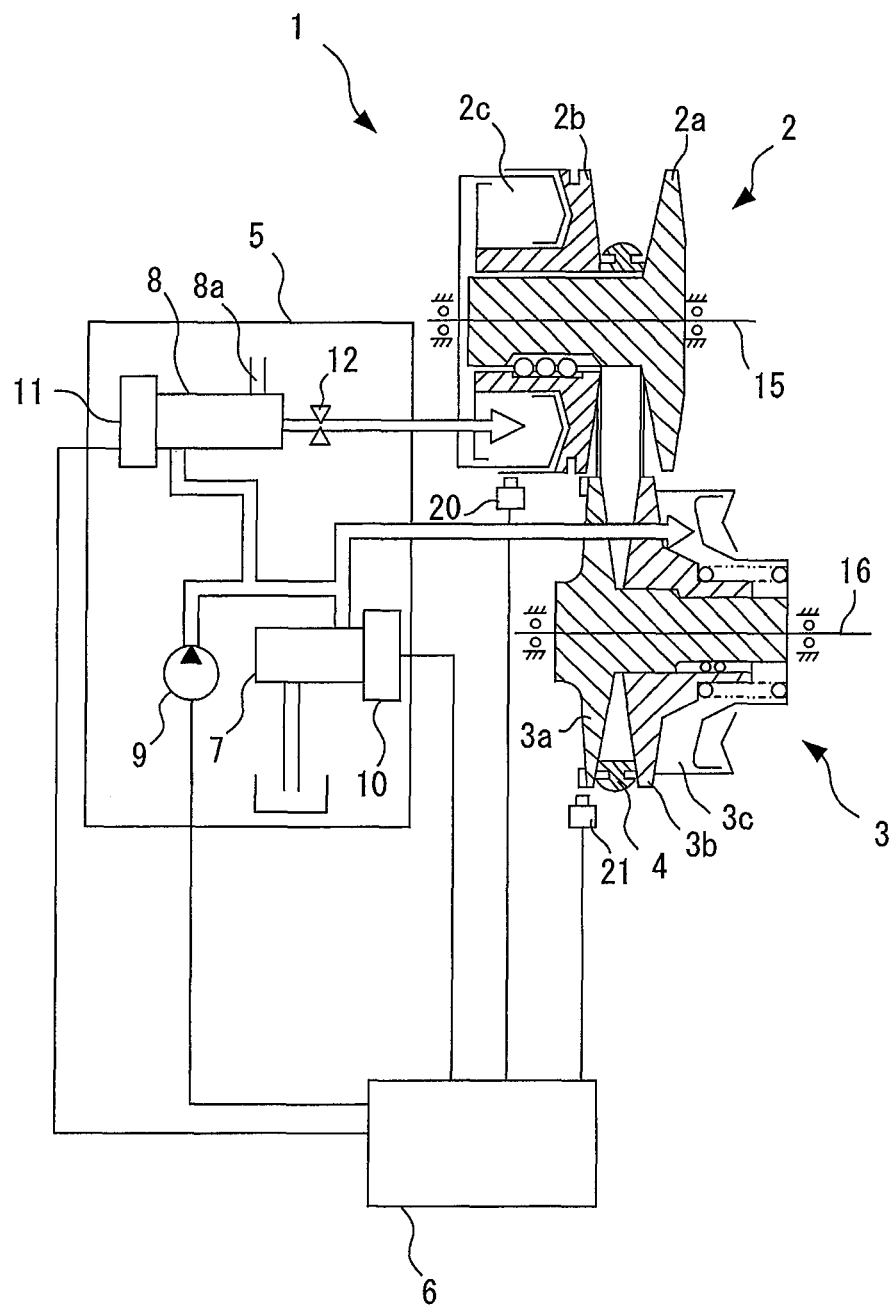
FIG. 1 is a schematic configuration diagram of a V-belt-type continuously-variable transmission according to the present embodiment.

A configuration of an embodiment of the present invention will be described with reference to FIG. 1. FIG. 1 is a schematic configuration diagram of a V-belt-type continuously-variable transmission according to the present embodiment. Note that, in the following description, the "speed ratio" refers to the value that is acquired by dividing the input revolution speed of a V-belt-type continuously-variable transmission (hereinafter referred to as "continuously-variable transmission") by the output revolution speed. Consequently, with a continuously-variable transmission, lower speed ratios are nearer the high side.

A continuously-variable transmission 1 has a primary pulley 2, a secondary pulley 3, a belt 4, an oil pressure control unit 5, and a control unit 6.

The primary pulley 2 has a fixed conical plate 2a, which, combined as one with an input shaft 15 and rotates, and a mobile conical plate 2b, which is placed opposite the fixed conical plate 2a and forms a pulley groove in the shape of the letter V. The mobile conical plate 2b is displaced in an axial direction as the primary pulley pressure is supplied to and discharged from a primary pulley cylinder chamber 2c. Rotation that is produced in a drive source such as an engine (not shown) is transmitted to the primary pulley 2 via a torque converter (not shown), the input shaft 15 and so on.

The secondary pulley 3 has a fixed conical plate 3a, which, combined as one with an output shaft 16 and rotates, and a mobile conical plate 3b, which is placed opposite the fixed conical plate 3a and forms a pulley groove in the shape of the letter V. The mobile conical plate 3b is displaced in an axial direction as the secondary pulley pressure is supplied to and discharged from a secondary pulley cylinder chamber 3c. By the belt 4, rotation is transmitted from the primary pulley 2 to the secondary pulley 3. The rotation that is transmitted to the secondary pulley 3 is transmitted to the driving wheels (not shown) via the output shaft 16, a differential (not shown) and so on.

The belt 4 is mounted between the primary pulley 2 and the secondary pulley 3, and transmits the rotation of the primary pulley 2 to the secondary pulley 3.

The oil pressure control unit 5 has a regulator valve 7 and a pressure reducing valve 8.

The regulator valve 7 has a solenoid 10 that adjusts the oil pressure discharged from an oil pressure pump 9. The regulator valve 7 adjusts the pressure of oil discharged from the oil pressure pump 9 to a predetermined line pressure to match the state of operation, by operating the solenoid 10 in accordance with commands from the control unit 6 (for example, the duty signal and so on). The line pressure is supplied to and discharged from the secondary pulley cylinder chamber 3c as a secondary pulley pressure.

The pressure reducing valve 8 has a solenoid 11 that adjusts the line pressure. The pressure reducing valve 8 adjusts the line pressure to a predetermined primary pulley pressure to match the state of operation, by operating the solenoid 11 in accordance with commands from the control unit 6 (for example, the duty signal and so on). The primary pulley pressure is supplied to and discharged from a primary pulley cylinder chamber 2c. When oil pressure is discharged from the primary pulley cylinder chamber 2c, the primary pulley cylinder chamber 2c and a drain 8a of the pressure reducing valve 8 are connected and form a discharge path. An orifice 12 is formed between the pressure reducing valve 8 and a primary pulley cylinder chamber 2c, and, in the orifice 12, channel resistance is produced against the flow of oil.

The control unit 6 outputs signals for controlling the solenoids 10 and 11 based on the signal from a primary pulley revolution speed sensor 20, the signal from a secondary pulley revolution speed sensor 21, and controls the primary pulley pressure and the secondary pulley pressure. By this means, the actual speed ratio of the continuously-variable transmission 1 is changed to follow the target speed ratio.

Figure 2:
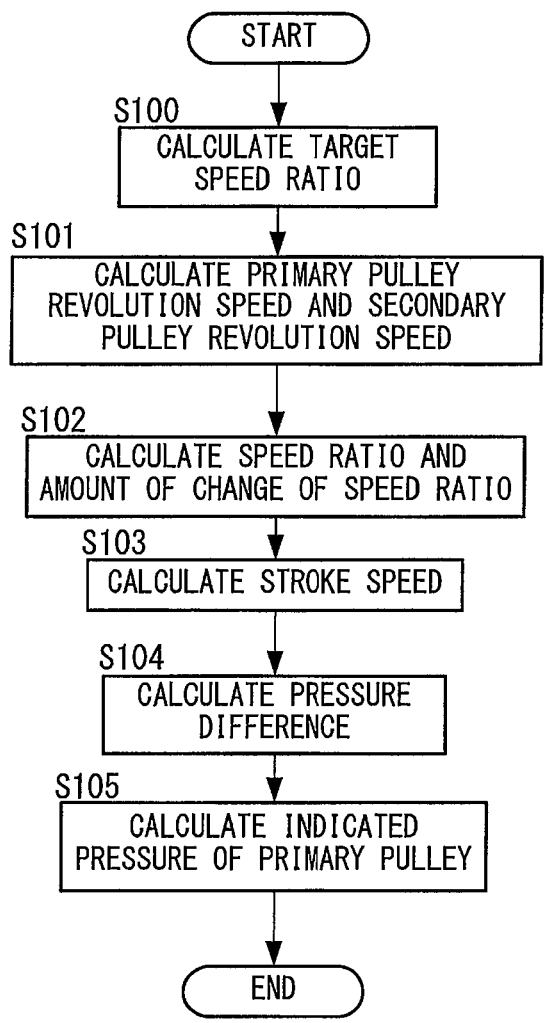
FIG. 2 is a flowchart to explain a method of calculating a primary pulley pressure according to the present embodiment.

Next, the method of calculating the primary pulley pressure will be described with reference to the flowchart of FIG. 2.

In step S100, the control unit 6 calculates the target speed ratio based on signals of the accelerator pedal opening, engine torque (input torque) and so on.

In step S101, the control unit 6 calculates the primary pulley revolution speed Np based on the signal from the primary pulley revolution speed sensor 20, and calculates the secondary pulley revolution speed Ns based on the signal from the secondary pulley revolution speed sensor 21.

In step S102, the control unit 6 calculates the speed ratio ip, and the amount of change in the speed ratio ip', based on the primary pulley revolution speed Np and the secondary pulley revolution speed Ns. The amount of change in the speed ratio ip' is the amount of change of the speed ratio per unit time, and is calculated using the primary pulley revolution speed Np and the secondary pulley revolution speed Ns calculated in step S101 in the previous control.

In step S103, the control unit 6 calculates the stroke speed $x_p$ of the mobile conical plate 2b of the primary pulley 2 based on equation 1.

[1]

$$x_p = -2\tan(f)\frac{\{2(1-ip)R_p^2 - \pi CR_p\}ip'}{\{2(1-ip)^2 R_p + \pi C(1+ip)\}} \quad (1)$$

f is the sheave angle of the primary pulley 2. $R_p$ is the contact radius between the primary pulley 2 and the belt 4, and calculated based on equation 2. C is the inter-axial distance between the primary pulley 2 and the secondary pulley 3.

[2]

$$R_p = \frac{-b + \sqrt{b^2 - 4ac}}{2a} \quad (2)$$

a, b and c are the values shown in equation 3.

$a = (1-ip)^2$ $b = \pi C(1+ip)$ $c = -LC + 2C^2 \quad (3)$

L is the length of the belt 4.

In step S104, the control unit 6 calculates the pressure difference ($P_1$-$P_2$) before and after the orifice 12 when oil is discharged from primary pulley cylinder chamber 2c shown in equation 6, from the amount of change in the amount of flow $Q_p$, of oil in the primary pulley cylinder chamber 2c, shown in equation 4, and the amount of flow $Q_v$, of oil discharged from the drain 8a of the pressure reducing valve 8, shown in equation 5. The amount of change in the amount of flow $Q_p$ and the amount of flow $Q_v$ are equal.

[4]

$$Q_p = A_p x_p \quad (4)$$

[5]

$$Q_v = cA_{orf}\sqrt{\frac{2}{r}(P_1 - P_2)} \quad (5)$$

[6]

$$P_1 - P_2 = \frac{r}{2}\left(\frac{A_p x_p}{cA_{orf}}\right)^2 \quad (6)$$

$A_p$ is the pressure receiving area of the mobile conical plate 2b of the primary pulley 2. c is the discharge coefficient. $A_{orf}$ is the contraction area of the orifice 12. r is the density of oil. $P_1$ is the pressure on the side closer to the primary pulley 2 than the orifice 12. $P_2$ is the pressure on the side closer to the drain 8a than the orifice 12, and is the indicated pressure of the primary pulley pressure.

The pressure difference ($P_1$-$P_2$) before and after the orifice 12 is the amount of increase of the inner pressure in the primary pulley cylinder chamber 2c in accordance with the channel resistance of the orifice 12 and the stroke speed $x_p$ of the mobile conical plate 2b of the primary pulley 2. The amount of increase of the inner pressure in the primary pulley cylinder chamber 2c increases as the stroke speed $x_p$ increases. Thus, in step S105, the control unit 6 subtracts the amount of increase of the inner pressure in the primary pulley cylinder chamber 2c from the primary pulley pressure (the first pulley pressure) calculated based on the accelerator pedal opening, engine torque and so on, and calculates the indicated pressure of the primary pulley pressure.

The pressure reducing valve 8 is controlled in accordance with the indicated pressure of the primary pulley pressure calculated, so that the primary pulley pressure decreases quickly, and it is therefore possible to improve the performance of the actual speed ratio in following the target speed ratio.

Figure 3:
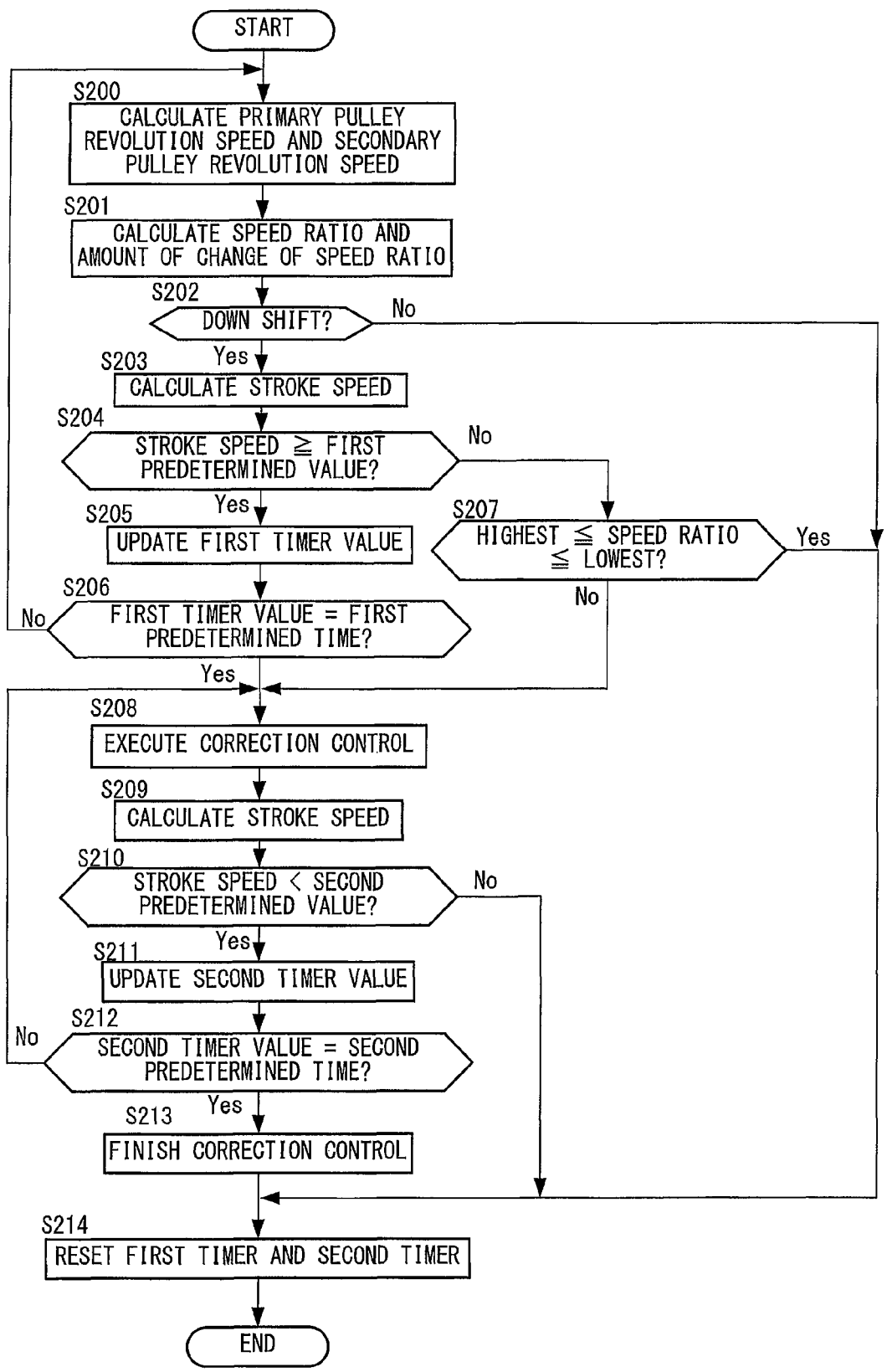
FIG. 3 is a flowchart to explain correction control for correcting the indicated pressure of the primary pulley pressure according to the present embodiment.

Next, correction control to correct the indicated pressure of the primary pulley pressure, described with reference to FIG. 2, will be described with reference to the flowchart of FIG. 3.

In step S200, the control unit 6 calculates the primary pulley revolution speed Np based on the signal from the primary pulley revolution speed sensor 20, and calculates the secondary pulley revolution speed Ns based on the signal from the secondary pulley revolution speed sensor 21.

In step S201, the control unit 6 calculates the speed ratio ip, and the amount of change in the speed ratio ip', based on the primary pulley revolution speed Np and the secondary pulley revolution speed Ns. The method of calculation is the same as in step S101.

In step S202, the control unit 6 decides whether or not a down shift is in progress. The control unit 6 moves on to step S203 if a down shift is in progress, and moves on to step S214 if a down shift is not in progress.

In step S203, the control unit 6 calculates the stroke speed $x_p$ of the mobile conical plate 2b of the primary pulley 2 based on equation 1.

In step S204, the control unit 6 decides whether the calculated stroke speed $x_p$ is equal to or greater than the first predetermined value. The control unit 6 moves on to step S205 when the stroke speed $x_p$ is equal to or greater than the first predetermined value, and moves on to step S207 when the stroke speed $x_p$ is lower than the first predetermined value. The first predetermined value is a value that is set in advance, is a value that may be assumed when no belt slippage occurs between the belt 4 and the primary pulley 2, and, for example, is the limit value at which belt slippage does not occur.

When belt slippage occurs between the primary pulley 2 and the belt 4, the primary pulley revolution speed Np increases, and the speed ratio ip increases. Since the stroke speed $x_p$ is calculated based on equation 1, when the belt slips, the stroke speed $x_p$ increases despite the fact that the mobile conical plate 2b of the primary pulley 2 is not moving, or the stroke speed $x_p$ increases with respect to the actual amount of move of the mobile conical plate 2b of the primary pulley 2.

In step S205, the control unit 6 updates the value on a first timer. The control unit 6 adds 1 to the present value on the first timer. The value on the first timer is set to zero as the initial value, and returns to zero when re-set.

In step S206, the control unit 6 compares the first timer value and a first predetermined time. The control unit 6 determines whether the state in which the first timer value reaches the first predetermined time, that is, the state in which the stroke speed $x_p$ is equal to or greater than a first predetermined value has continued for the first predetermined time. The control unit 6 moves on to step S208 when the first timer value has reached the first predetermined time, or returns to step S200 and repeats the above control when the first timer value has not reached the first predetermined time.

In step S207, the control unit 6 determines whether the speed ratio ip is equal to or greater than the highest and is equal to or lower than the lowest. When the speed ratio ip is equal to or greater than the highest and is equal to or lower than the lowest, the control unit 6 determines that the speed ratio ip is in the range which the speed ratio ip normally assumes, that is, determines that belt slippage has not occurred, and moves on to step S214. When the speed ratio ip is lower than the highest or greater than the lowest, the control unit 6 determines that the speed ratio ip is in a range which the speed ratio ip does not normally assume, that is, determines that belt slippage has occurred, and moves on to step S208.

When belt slippage occurs, there is a threat that the control unit 6 erroneously detects that the pressure difference ($P_1$-$P_2$) before and after the orifice 12 shown in equation 6 has increased. When an erroneous detection is made, the indicated pressure of the primary pulley pressure becomes lower. Because of this, the strength with which the primary pulley 2 holds the belt 4 lowers, and therefore the belt slips further. Thus, in step S208, the control unit 6 executes correction control to correct the primary pulley pressure. To be more specific, the amount of increase of the inner pressure in the primary pulley cylinder chamber 2c is added to the indicated pressure of the primary pulley pressure.

In step S209, the control unit 6 calculates the stroke speed $x_p$ of the mobile conical plate 2b of the primary pulley 2 based on equation 1.

In step S210, the control unit 6 determines whether the stroke speed $x_p$ calculated in step S209 is lower than a second predetermined value. The control unit 6 moves on to step S211 when the stroke speed $x_p$ is lower than the second predetermined value, or moves on to step S214 when the stroke speed $x_p$ is equal to or greater than the second predetermined value. The second predetermined value is a value to allow deciding that belt slippage has settled, is lower than the first predetermined value, and is set in advance.

In step S211, the control unit 6 updates the value on a second timer. The control unit 6 adds 1 to the present value on the second timer. The second timer value is set to zero as the initial value and returns to zero when re-set.

In step S212, the control unit 6 compares the second timer value and a second predetermined time. The control unit 6 moves on to step S213 when the second timer value reaches the second predetermined time, or returns to step S208 and repeats the above control when the second timer value does not reach the second predetermined time. The second predetermined time is a value to allow deciding that belt slippage has settled based on the fact that the state in which the stroke speed $x_p$ is lower than a second predetermined value continues, and is set in advance.

In step S213, the control unit 6 finishes the correction control.

In step S214, the control unit 6 re-sets the first timer and the second timer.

Advantages of the present invention will be described.

During a down shift, the amount of increase of the inner pressure in the primary pulley cylinder chamber 2c is calculated based on the stroke speed $x_p$ of the mobile conical plate 2b of the primary pulley 2 and the channel resistance of the orifice 12, and the value given by subtracting the amount of increase from the primary pulley pressure calculated from the accelerator pedal opening, engine torque and so on is made the indicated pressure of the primary pulley 2. By this means, during a down shift, it is possible to prevent the increase of the oil pressure in the primary pulley cylinder chamber 2c, so that it is possible to improve the performance of the actual speed ratio in following the target speed ratio, and shift gears quickly.

When belt slippage occurs, the amount of decrease of the primary pulley pressure becomes greater, the strength with which the primary pulley 2 holds the belt 4 lowers, and therefore there is a threat of further belt slippage.

Thus, when belt slippage occurs between the belt 4 and the primary pulley 2, correction control to add the amount of increase of the inner pressure in the primary pulley cylinder chamber 2c to the indicated pressure of the primary pulley 2 is executed. By this means, even when belt slippage occurs, it is possible to prevent the indicated pressure of the primary pulley pressure from decreasing, and prevent further belt slippage from occurring.

When the speed ratio is not a speed ratio that can be normally assumed, that is, when the speed ratio is lower than the highest or when the speed ratio is greater than the lowest, it is decided that belt slippage occurs, and the primary pulley pressure correction control is executed. By this means, it is possible to prevent further belt slippage from occurring.

When the stroke speed $x_p$ is greater than the first predetermined value which may be assumed when no belt slippage occurs, it is determined the belt slippage occurs, and the correction control is executed. By this means, it is possible to prevent further belt, slippage from occurring.

When belt slippage settles, by finishing the correction control, it is possible to change the actual speed ratio to the target speed ratio quickly, and shift gears quickly.

The present invention is not limited to the embodiments described above and obviously includes various modifications and improvements which can be made within the scope of the technical concept thereof.

Although a method of calculating the primary pulley pressure during a down shift has been described with the above embodiment, this is by no means limiting, and it is equally possible to apply the present invention to cases where pulleys are moved by discharging oil pressure.

Although, a V-belt type continuously-variable transmission to use the belt 4 as a drive force transmitting member has been described above, the drive force transmitting member does not necessarily have to be the belt 4 and may be a chain or the like.

The channel resistance of the discharge path may take into account the friction resistance between the discharge path and oil, in addition to the channel resistance of the orifice 12.

This application claims priority based on Japanese Patent Application No. 2011-271982, filed with the Japan Patent Office, on Dec. 13, 2011, the entire content of which is expressly incorporated herein by reference.

The invention claimed is:

1. A continuously-variable transmission comprising:
a first pulley, which comprises:
  a first fixed pulley; and
  a first mobile pulley, which is arranged on a same axis with the first fixed pulley, and which changes a width of a groove formed between the first mobile pulley and the first fixed pulley by moving along an axial direction in accordance with supply and discharge of oil to and from a first pulley oil chamber;
a second pulley, which comprises:
  a second fixed pulley; and
  a second mobile pulley, which is arranged on a same axis with the second fixed pulley, and which changes a width of a groove formed between the second mobile pulley and the second fixed pulley by moving along an axial direction; and
a drive force transmitting member, which is mounted between the first pulley and the second pulley,
wherein the continuously-variable transmission comprises:
  an indicated pressure calculating unit configured to calculate an indicated pressure of the first pulley;
  a stroke speed calculating unit configured to calculate a stroke speed which is a moving speed of the first mobile pulley along the axial direction; and
  an oil pressure calculating unit configured to calculate an amount of increase of oil pressure in the first pulley oil chamber that increases due to channel resistance of a discharge path, based on the channel resistance and the stroke speed when oil is discharged from the first pulley oil chamber; and
wherein, when oil is discharged from the first pulley oil chamber, the indicated pressure calculating unit is configured to subtract the amount of increase of oil pressure from the first pulley pressure calculated based on a target speed ratio and input torque, and calculate the indicated pressure of the first pulley.

2. The continuously-variable transmission according to claim 1, further comprising:
a first revolution speed detecting unit configured to detect a first revolution speed of the first pulley;
a second revolution speed detecting unit configured to detect a second revolution speed of the second pulley;
a speed ratio calculating unit configured to calculate a speed ratio based on the first revolution speed and the second revolution speed;
a slippage determining unit configured to determine whether slippage of the drive force transmitting member occurs between the drive force transmitting member and the first pulley; and
a correcting unit configured to execute correction control to add the amount of increase of oil pressure to the indicated pressure of the first pulley when slippage of the drive force transmitting member occurs,
wherein the stroke speed calculating unit is configured to calculate the stroke speed based on the speed ratio.

3. The continuously-variable transmission according to claim 2, wherein the correcting unit is configured to execute the correction control when the speed ratio is lower than the highest or when the speed ratio is greater than the lowest.

4. The continuously-variable transmission according to claim 2, wherein the correcting unit is configured to execute the correction control when the stroke speed is greater than the speed when slippage of the drive force transmitting member occurs.

5. The continuously-variable transmission according to claim 2, wherein, when slippage of the drive force transmitting member is determined to have settled after the correction control is executed, the correcting unit is configured to finish the correction control.

6. A continuously-variable transmission control method for controlling a continuously-variable transmission comprising:
a first pulley, which comprises:
  a first fixed pulley; and
  a first mobile pulley, which is arranged on a same axis with the first fixed pulley, and which changes a width of a groove formed between the first mobile pulley and the first fixed pulley by moving along an axial direction in accordance with supply and discharge of oil to and from a first pulley oil chamber;

a second pulley, which comprises:
  a second fixed pulley; and
  a second mobile pulley, which is arranged on a same axis with the second fixed pulley, and which changes a width of a groove formed between the second mobile pulley and the second fixed pulley by moving along an axial direction; and a drive force transmitting member, which is mounted between the first pulley and the second pulley, wherein the continuously-variable transmission control method comprises:

calculating a stroke speed, which is a moving speed of the first mobile pulley along the axial direction;

when oil is discharged from the first pulley oil chamber, calculating an amount of increase of oil pressure in the first pulley oil chamber that increases due to channel resistance of a discharge path, based on the channel resistance and the stroke speed; and when oil is discharged from the first pulley oil chamber, subtracting the amount of increase of oil pressure from the first pulley pressure calculated based on a target speed ratio and input torque from a drive source, and calculating an indicated pressure of the first pulley.

7. A continuously-variable transmission comprising:

a first pulley, which comprises:
  a first fixed pulley; and
  a first mobile pulley, which is arranged on a same axis with the first fixed pulley, and which changes a width of a groove formed between the first mobile pulley and the first fixed pulley by moving along an axial direction in accordance with supply and discharge of oil to and from a first pulley oil chamber;

a second pulley, which comprises:
  a second fixed pulley; and
  a second mobile pulley, which is arranged on a same axis with the second fixed pulley, and which changes a width of a groove formed between the second mobile pulley and the second fixed pulley by moving along an axial direction; and a drive force transmitting member, which is mounted between the first pulley and the second pulley, wherein the continuously-variable transmission comprises:
  indicated pressure calculating means for calculating an indicated pressure of the first pulley;
  stroke speed calculating means for calculating a stroke speed which is a moving speed of the first mobile pulley along the axial direction; and
  oil pressure calculating means for calculating an amount of increase of oil pressure in the first pulley oil chamber that increases due to channel resistance of a discharge path, based on the channel resistance and the stroke speed when oil is discharged from the first pulley oil chamber; and wherein, when oil is discharged from the first pulley oil chamber, the indicated pressure calculating means is configured to subtract the amount of increase of oil pressure from the first pulley pressure calculated based on a target speed ratio and input torque, and calculate the indicated pressure of the first pulley.

\* \* \* \* \*